(12) United States Patent
Desabhatla et al.

(10) Patent No.: US 8,478,568 B2
(45) Date of Patent: Jul. 2, 2013

(54) PREDICTION SYSTEM AND METHOD

(75) Inventors: Sreedhar Desabhatla, Hyderabad (IN); Shashidhar Nibhanupudi, Hyderabad (IN)

(73) Assignee: General Electric Company, Schenectady, NY (US)

( * ) Notice: Subject to any disclaimer, the term of this patent is extended or adjusted under 35 U.S.C. 154(b) by 460 days.

(21) Appl. No.: 12/915,286

(22) Filed: Oct. 29, 2010

(65) Prior Publication Data

US 2012/0105022 A1 May 3, 2012

(51) Int. Cl.
*G06F 11/30* (2006.01)

(52) U.S. Cl.
USPC .................................................... 702/182

(58) Field of Classification Search
USPC ........................................................ 702/182
See application file for complete search history.

(56) References Cited

U.S. PATENT DOCUMENTS 6,421,618 B1 * 7/2002 Kliman et al. .................. 702/58

* cited by examiner

*Primary Examiner* — Stephen Cherry
(74) *Attorney, Agent, or Firm* — Cantor Colburn LLP

(57) ABSTRACT

A system for predicting a condition includes an electric machine having slip rings and an exciter providing current and voltage to the electric machine through the slip rings. The system also includes a monitoring device that measures the current and voltage provided by the exciter to the electric machine and that forms a regression model from a current sample and compares values from a next sample to values predicted by the regression model.

19 Claims, 4 Drawing Sheets

PREDICTION SYSTEM AND METHOD

BACKGROUND OF THE INVENTION

The present invention relates to electric machines and, in particular, to electric machines fed by an exciter.

The generation of electrical power typically includes one or more turbines. In the case of gas turbines, a compressor is coupled to a combustor that combusts a gas or fuel oil in a stream of compressed air. The combustor is coupled and provides a hot gas flow resulting from the combustion of the gas or fuel oil to a turbine portion. The turbine portion includes a rotor with attached blades. The hot gas is passed over the blades, which, in turn, causes the rotor to turn. In this manner, the energy from the hot gas is converted to rotary motion.

To generate electricity, the rotor is coupled to a generator. In this respect, the turbine rotor acts as the prime mover for the generator. Of course, other sources could act as the prime mover.

In general, a generator converts rotary motion into electricity. In more detail, a generator includes an armature and a field. The armature is the power-producing component of a generator and includes armature windings that generate the output electrical current. The armature can be on either the rotor or the stator. The field is the magnetic field component of a generator. Power transferred into the field circuit is typically much less than in the armature circuit. Accordingly, generators nearly always have the field winding on the rotor and the stator serves as the armature winding. In such a configuration, only a small amount of field current needs to be transferred to the rotor from an exciter via slip rings.

A slip ring is an electromechanical device that allows the transmission of power and electrical signals from a stationary structure to a rotating structure. In the case of a generator, the slip rings allow for current to be passed from an exciter to the rotor. The slip rings are coupled to the rotor and receive current from the exciter through fixed contacts or brushes held in contact with the rings.

BRIEF DESCRIPTION OF THE INVENTION

According to one aspect of the invention, a system for predicting a condition is disclosed. The system of this aspect includes an electric machine that includes a rotating shaft, two or more slip rings disposed about the rotating shaft and an exciter that provides current and voltage to the electric machine through the slip rings. The system of this aspect also includes a monitoring device configured to measure the current and voltage provided by the exciter to the electric machine. The monitoring device is further configured to: group a first plurality of currents and voltages into a current sample; create a regression model from the current sample; group a second plurality of currents into a next sample; calculate a series of predicted parameters with the regression model using values from the next sample; and generate an alarm when the predicted parameters exhibit specific variations from the next sample.

According to another aspect of the invention, a method of predicting a condition is disclosed. The method of this aspect includes: measuring a first plurality of currents and voltages provided from an exciter to a generator; storing the first plurality on a computing device as a current sample; creating a regression model from the current sample; measuring a second plurality of currents and voltages provided from the exciter to the generator; storing the second plurality of currents into a next sample; calculating on the computing device a series of predicted parameters with the regression model using values from the next sample; and generating an alarm when the predicted parameters exhibit specific variations from the next sample.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
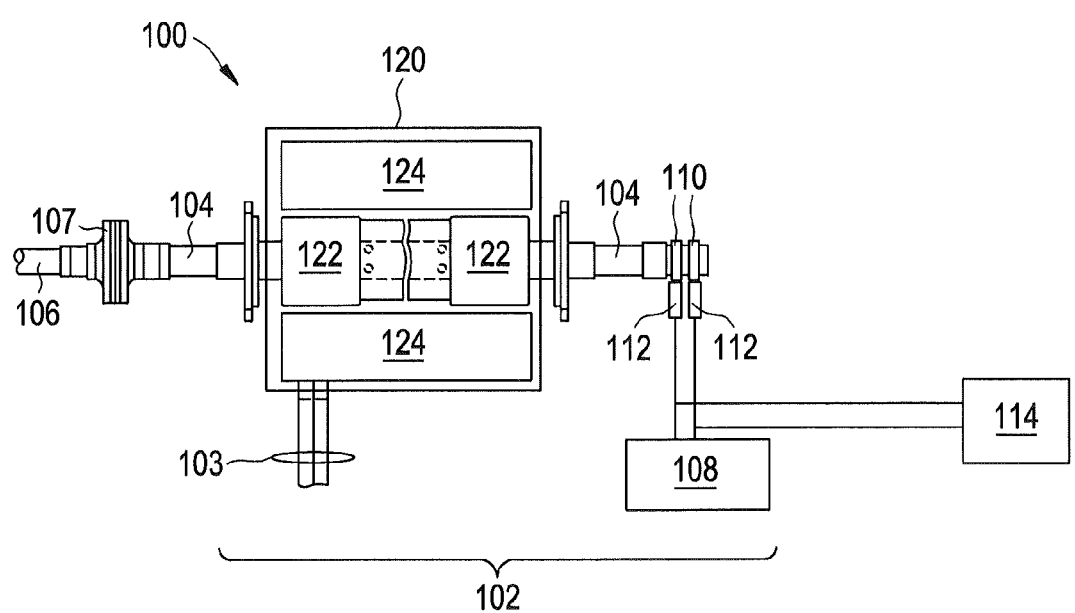
FIG. 1 illustrates a system according to one embodiment.

FIG. 1 shows an example of system 100 according to an embodiment of the present invention. In one embodiment, the system 100 is utilized to prevent, predict or otherwise avoid a flashover condition. As described below, a "flashover condition" results in the undesired ignition of combustible material in an enclosed area. Of course, the system 100 could be utilized for other purposes. For example, the system 100 may be utilized to monitor the health of the field winding of an electric machine.

In the illustrated embodiment, the system 100 includes an electric machine 102. The electric machine 102 depicted is configured to convert mechanical energy into electrical energy as indicated by electrical output 103. In such a case, the electrical machine 102 is a generator. Of course, depending on the configuration, the electric machine 102 could be operated as a motor. However, for clarity, the following description is directed only to operation as a generator but is not so limited. The electrical output 103 is shown as a three-phase output. It shall be understood that the electrical output 103 may have any number of phases and include any number of conductors.

The electric machine 102 includes a rotating shaft 104. The rotating shaft 104 is illustrated coupled to a prime mover 106 by a coupling 107. The prime mover 106 may be, for example, a rotor of a turbine. In operation, the electric machine 102 converts rotational energy received from the prime mover 106 into electrical energy provided at electric output 103. Of course, according to one embodiment, the prime mover 106 and coupling 107 may be omitted from the system 100.

The electric machine 102 includes a body portion 120. In FIG. 1, the body portion 120 is shown in cut-away and includes a field 122 surrounded by an armature 124. Of course, in an alternative embodiment, the armature 124 may be surround by the field 122.

When operating as a generator, the electric machine 102 requires excitation of its field 122. The field 122 is typically coupled to the rotating shaft 104 and receives electrical energy from an exciter 108. The mechanical elements that transfer electrical energy from the exciter 108 to the field 122 include slip rings 110 on the rotating shaft 104. The slip rings 110 are in electrical engagement with contacts 112. The contacts 112 are brushes in one embodiment. The contacts 112 receive electrical energy from the exciter 108 and provide it to the slip rings 110. In this manner, electrical energy may be provided to the field winding of electric machine 102.

In some cases, a condition referred to a "flashover" between the slip rings 110 may occur. The term "flashover" refers to the undesired ignition of combustible material in an enclosed area. In the case of the system 100 shown in FIG. 1, may occur in the area between or surrounding slip rings 110. The flashover may be due to wear and tear, a break in the field winding, improper insulation, poor maintenance, incorrect installation of brushes, contamination of the surface of the rotating shaft 104 between the slip rings 110 and the like. Regardless of the cause, such a flashover may require that the electric machine 102 be taken off line for repairs. In some cases, the repairs may be major. Alternatively, if the conditions preceding a flashover are monitored, repairs may be made to the contacts 112, the slip rings 110 or the shaft 104 in the area of these elements to prevent the flashover. Such repairs typically are less time consuming than repairs needed after a flashover.

Accordingly, the system 100 includes a monitoring device 114. The monitoring device 114 monitors one or both of the current and voltage provided by the exciter 108 to the contacts 112. Monitoring the current and voltage values provides warning as to when a flashover may occur. Such a warning allows for flashover to be avoided. In one embodiment, the monitoring device 114 applies a rolling regression to the field current and field voltage. In one embodiment, the monitoring device 114 samples field voltage and field current once every second for ten seconds groups these currents and voltages into a so-called "current sample." The current sample is used to compute a regression model having regression. The regression coefficients and the sample vectors of the current iteration are stored for later processing. The monitoring device 114 then again samples the field current and field voltage to create a next sample. One or the other of the currents and voltages are then applied to the regression model to create predicted current or voltage values. According to one embodiment, the deviation of the predicted values from the actual values is expected to be less than a threshold level (e.g., 1%). Otherwise, an alarm is created.

Figure 2:
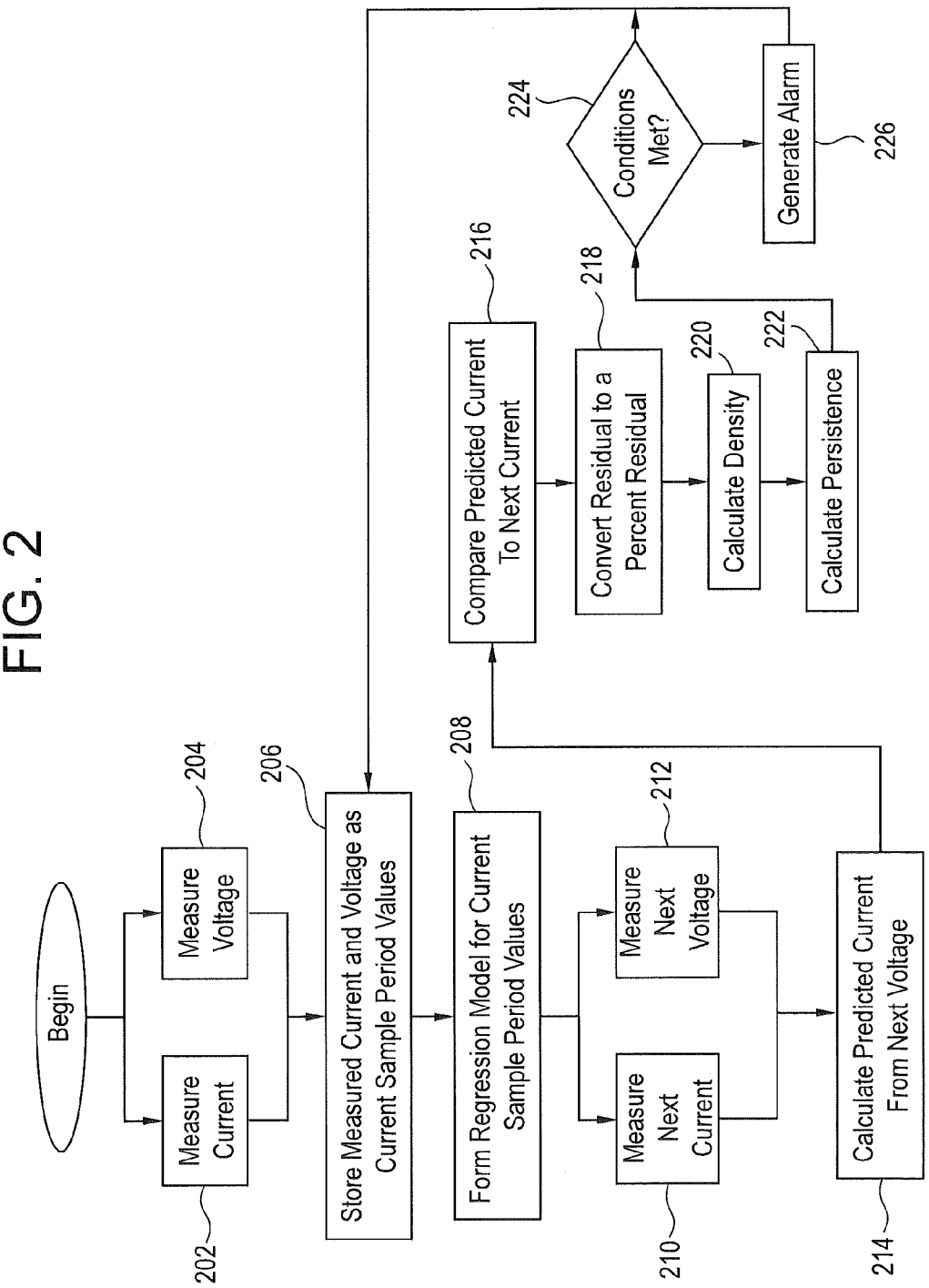
FIG. 2 is a flow chart showing a method according to one embodiment.

FIG. 2 shows an example of a method of monitoring the health of the field of an electric machine according to one embodiment. Such monitoring can be utilized to predict a flashover between slip rings in one embodiment. The method shown in FIG. 2 may be partially or completely performed by a computing device. In one embodiment, any of the processes shown below may be performed by the monitoring device 114 (FIG. 1).

The method begins at block 202 where the field current being provided to an electric machine is measured. In one embodiment, the current is measured at predetermined time intervals for a predetermined amount of amount of time. For example, the current may be measure once a second for ten seconds. Of course, other time periods or sample rates could be utilized. At or about the same time, at block 204 the field voltage being provided to the electric machine is measured. Like the current measure at block 202, the voltage measured at block 204 is measured at predetermined time intervals for a predetermined amount of time in one embodiment. In one embodiment, the voltages measured at block 204 are measured at the same time the currents measured at block 202 are measured. It shall be understood that the measurements of block 202 and 204 may be live measurements or may be based on data received from an external source.

The measured voltages and currents for the current sample period are moved into one or more calculation arrays at block 206. In a particular example, the measured values for the current sample are stored in separate arrays. In more detail, the measured voltages are stored in a first array (x) and the measured currents are stored in a second array (y).

At a block 208, a regression model is created based on the x and y arrays. In one embodiment, the regression model includes an intercept value. In such an embodiment, the regression model follows the general format Expected_Current=f(Expected_Voltage)+intercept. Of course, the regression model could, alternately, follow the general format of Expected_Voltage=f(Expected_Current)+intercept. For simplicity, the first model form is discussed below but it shall be understood that either is applicable. Regardless of the exact form, the regression model includes coefficients. The coefficients are determined, according to one embodiment, by solving equation 1:

$$\text{Inv}(\text{transpose}(x)*x)*\text{transpose}(x)*y \quad (1)$$

Of course, other equations or methods may be utilized to determine the regression coefficients.

At blocks 210 and 212, a next sample of currents and voltages are formed. As before, this next sample may include a plurality of current and voltages samples taken at predetermined time intervals for a predetermined amount of time. For example, the current and voltage may be measure once a second for ten seconds.

At block 214, predicted values of current are calculated from the voltages measured at block 212. That is, the next sample voltages are applied to the current regression model to produce predicted current values.

At block 216 the predicted current values are compared to the actual next sample current values. This comparison yields what is referred to herein as a residual value. The residual value is the difference between the predicted current and the actual measured current. It shall be understood that if the second regression model format shown above is utilized, in blocks 214 and 216, predicted voltages, rather than predicted currents, are calculated and compared to the actual next sample voltage values.

At block 218 the residual value is converted to a percentage residual value for each sample point by dividing the residual value by the actual measured value. At block 220 a density of percentage residual values that exceed a threshold value (e.g., 1%) is calculated. The density is the percentage of the number of residual values exceeding the threshold in the collective sample vector divided by the collective sample vector.

At block 222 the persistence of the exceeding values is determined. The persistence is based on the number of successive percentage residual values that exceed the threshold value. In short, persistence is a measure of extended successive abnormal current/voltage conditions. In one embodiment, the persistence is the median of the differences in indices of the residual vector elements that exceed the threshold value.

At block 224 an alarm is generated if certain conditions are met. These conditions may include either or both the density and persistence values. In one embodiment, the conditions are met if the density is greater than 1 and the persistence is greater than or equal to 2.

At block 226, the next sample is moved into the first arrays x and y and becomes the current sample and processing returns to block 206.

It shall be understood that applying the above method in a system the same or similar to system 100 shown in FIG. 1 may allow for live data from a generator field to estimate health of the field (including the slip rings). In short, the system 100 disclosed, in one embodiment, has the technical effect of providing real time determination of whether a particular field may experience a flashover.

Figure 3:
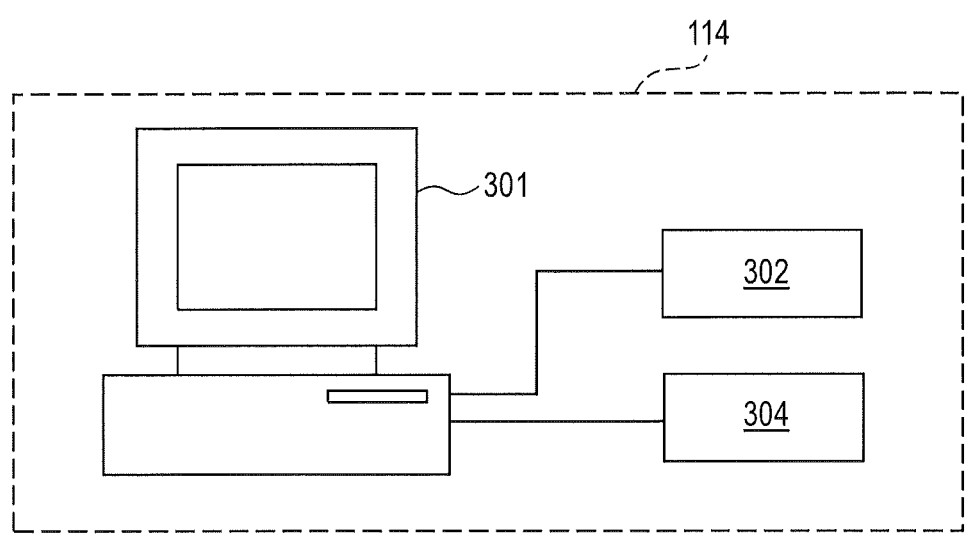
FIG. 3 is a block diagram showing a more detailed depiction of a monitoring device according to one embodiment.

As discussed above, the system 100 of FIG. 1 includes a monitoring device 114. Referring now to FIG. 3, the monitoring device 114 may be implemented as a general-purpose computer 301 that includes a current measurement apparatus 302 and a voltage measurement apparatus 304 either integrally formed therein or coupled thereto.

Figure 4:
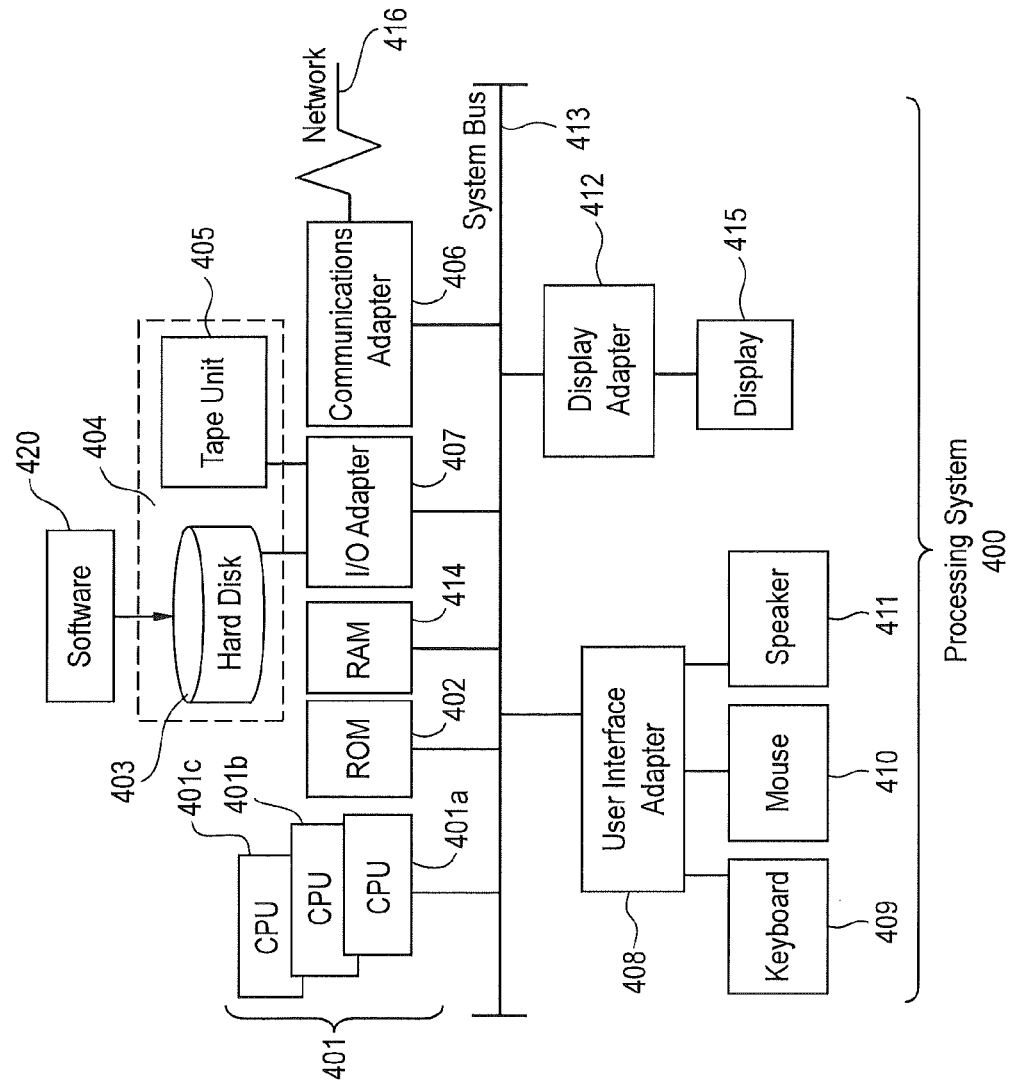
FIG. 4 is a block diagram of a computing device on which embodiments of the present invention may be implemented.

FIG. 4 shows an example of a computing system (e.g., general-purpose computer 301 of FIG. 3) on which embodiments of the present invention may be implemented. In this embodiment, the system 400 has one or more central processing units (processors) 401a, 401b, 401c, etc. (collectively or generically referred to as processor(s) 401). In one embodiment, each processor 401 may include a reduced instruction set computer (RISC) microprocessor. Processors 401 are coupled to system memory 414 and various other components via a system bus 413. Read only memory (ROM) 402 is coupled to the system bus 413 and may include a basic input/output system (BIOS), which controls certain basic functions of system 400.

FIG. 1 further depicts an input/output (I/O) adapter 407 and a network adapter 406 coupled to the system bus 413. I/O adapter 407 may be a small computer system interface (SCSI) adapter that communicates with a hard disk 403 and/or tape storage drive 405 or any other similar component. I/O adapter 407, hard disk 403, and tape storage device 405 are collectively referred to herein as mass storage 404. A network adapter 406 interconnects bus 413 with an outside network 416 enabling data processing system 400 to communicate with other such systems. A screen (e.g., a display monitor) 415 is connected to system bus 413 by a display adaptor 412, which may include a graphics adapter to improve the performance of graphics intensive applications and a video controller. In one embodiment, adapters 407, 406, and 412 may be connected to one or more I/O busses that are connected to system bus 413 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 413 via user interface adapter 408 and display adapter 412. A keyboard 409, mouse 410, and speaker 411 are all interconnected to bus 413 via user interface adapter 408, which may include, for example, an I/O chip integrating multiple device adapters into a single integrated circuit.

Thus, as configured in FIG. 1, the system 400 includes processing means in the form of processors 401, storage means including system memory 414 and mass storage 404, input means such as keyboard 409 and mouse 410, and output means including speaker 411 and display 415. In one embodiment, a portion of system memory 414 and mass storage 404 collectively store an operating system to coordinate the functions of the various components shown in FIG. 4.

It will be appreciated that the system 400 can be any suitable computer or computing platform, and may include a terminal, wireless device, information appliance, device, workstation, mini-computer, mainframe computer, personal digital assistant (PDA) or other computing device. It shall be understood that the system 100 may include multiple computing devices linked together by a communication network. For example, there may exist a client-server relationship between two systems and processing may be split between the two.

As disclosed herein, the system 400 includes machine-readable instructions stored on machine readable media (for example, the hard disk 404) performing one or more of the methods disclosed herein. As discussed herein, the instructions are referred to as "software" 420. The software 420 may be produced using software development tools as are known in the art. The software 420 may include various tools and features for providing user interaction capabilities as are known in the art.

In some embodiments, the software 420 is provided as an overlay to another program. For example, the software 420 may be provided as an "add-in" to an application (or operating system). Note that the term "add-in" generally refers to supplemental program code as is known in the art. In such embodiments, the software 420 may replace structures or objects of the application or operating system with which it cooperates.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for predicting a condition, the system comprising:
    an electric machine, the electric machine including a rotating shaft and two or more slip rings disposed about the rotating shaft;
    an exciter providing a current and a voltage to the electric machine through the two or more slip rings; and
    a monitoring device configured to periodically measure the current and voltage provided by the exciter to the electric machine, the monitoring device further configured to:
        group a first plurality of currents and into a current sample;
        create a regression model from the current sample;
        group a second plurality of currents and voltages into a next sample;
        calculate a series of predicted parameters with the regression model using values from the next sample; and
        generate an alarm when the predicted parameters exhibit specific variations from the next sample.

2. The system of claim 1, wherein the electric machine is a generator.

3. The system of claim 1, wherein the exciter is coupled to brushes that contact the two or more slip rings.

4. The system of claim 1, wherein the monitoring device is configured to sample the current and voltage provided by the exciter a fixed number of times at a fixed time interval to form the first plurality of currents and voltages.

5. The system of claim 4, wherein the fixed number is ten and the fixed time interval is one second.

6. The system of claim 4, wherein the monitoring device is further configured to sample the current and voltage provided by the exciter the fixed number of times at the fixed time interval to form the second plurality of currents and voltages.

7. The system of claim 1, wherein the regression model predicts an expected current based on a measured voltage value and the series of predicted parameters are expected currents.

8. The system of claim 1, wherein the regression model predicts an expected voltage based on a measured current value and the series of predicted parameters are expected voltages.

9. The system of claim 1, where the specific variations include at least one of density and persistence.

10. The system of claim 9, wherein the density is a total number of samples having a residual percentage that exceeds a threshold divided by the total number of samples that do not have a residual percentage that exceeds the threshold.

11. The system of claim 9, wherein the persistence is a number of successive samples having a residual percentage that exceeds a threshold times a sample rate.

12. A method of predicting a condition, the method comprising:
    measuring a first plurality of currents and voltages provided from an exciter to a generator;
    storing the first plurality on a computing device as a current sample;
    creating a regression model from the current sample;
    measuring a second plurality of currents and voltages provided from the exciter to the generator;
    storing the second plurality of currents into a next sample;
    calculating on the computing device a series of predicted parameters with the regression model using values from the next sample; and
    generating an alarm when the predicted parameters exhibit specific variations from the next sample.

13. The method of claim 12, wherein measuring the first plurality includes measuring the current and voltage provided by the exciter a fixed number of times at a fixed time interval.

14. The method of claim 13, wherein the fixed number is ten and the fixed time interval is one second.

15. The method of claim 12, wherein the regression model predicts an expected current based on a measured voltage value and the series of predicted parameters are expected currents.

16. The method of claim 12, wherein the regression model predicts an expected voltage based on a measured current value and the series of predicted parameters are expected voltages.

17. The method of claim 12, where the specific variations include at least one of density and persistence.

18. The method of claim 17, wherein the density is the total number of samples having a residual percentage that exceeds a threshold divided by the total number of samples that do not have a residual percentage that exceeds the threshold.

19. The system of claim 17, wherein the persistence is the number of successive samples having a residual percentage that exceeds a threshold times a sample rate.

* * * * *